(12) United States Patent
Gatti et al.

(10) Patent No.: US 10,687,660 B2
(45) Date of Patent: Jun. 23, 2020

(54) ESPRESSO COFFEE MACHINE AND METHOD FOR DISPENSING AN ESPRESSO COFFEE

(71) Applicant: LA MARZOCCO S.R.L., Scarperia (FI) (IT)

(72) Inventors: Riccardo Gatti, Scarperia (IT); Tommaso Berna, Scarperia (IT); Roberto Bianchi, Scarperia (IT)

(73) Assignee: LA MARZOCCO S.R.L., Scarperia (FI) (IT)

( * ) Notice: Subject to any disclaimer, the term of this patent is extended or adjusted under 35 U.S.C. 154(b) by 0 days.

(21) Appl. No.: 15/768,534

(22) PCT Filed: Oct. 20, 2016

(86) PCT No.: PCT/EP2016/075182
§ 371 (c)(1),
(2) Date: Apr. 13, 2018

(87) PCT Pub. No.: WO2017/068021
PCT Pub. Date: Apr. 27, 2017

(65) Prior Publication Data
US 2018/0303284 A1 Oct. 25, 2018

(30) Foreign Application Priority Data
Oct. 22, 2015 (IT) .............................. 102015645355

(51) Int. Cl.
*A47J 31/52* (2006.01)
*A47J 31/36* (2006.01)
(52) U.S. Cl.
CPC ........... *A47J 31/5255* (2018.08); *A47J 31/36* (2013.01); *A47J 31/52* (2013.01)

(58) Field of Classification Search
CPC .............................. A47J 31/36; A47J 31/5255
See application file for complete search history.

(56) References Cited

U.S. PATENT DOCUMENTS 8,857,318 B2 * 10/2014 Zhong ..................... A47J 31/46
99/281

FOREIGN PATENT DOCUMENTS

CN 102761565 * 10/2012
EP 2 314 182 4/2011
(Continued)

OTHER PUBLICATIONS

English Translation for CN102761565 published Oct. 2012.*
(Continued)

*Primary Examiner* — Anthony J Weier
(74) *Attorney, Agent, or Firm* — Nixon & Vanderhye P.C.

(57) ABSTRACT

A machine for preparing and dispensing an espresso coffee including: a water supply (1) for feeding cold water; a dispensing group (19) and a corresponding coffee boiler (18); a coffee pump (7) which receives heated water and pumps said heated water towards said coffee boiler (18); a flow meter (9) arranged between said coffee pump (7) and said coffee boiler (18) for measuring an instantaneous water flow rate, i.e., the volume of water that passes from said coffee pump to said coffee boiler per unit of time; a memory for storing at least one pressure profile, wherein said coffee pump (7) is configured to operate according to said pressure profile during coffee dispensing; and a control unit (15) which stops dispensing of coffee based on a measurement of water flow calculated from starting time of the dispensing.

18 Claims, 6 Drawing Sheets

(56) References Cited

FOREIGN PATENT DOCUMENTS

EP          2 490 580      10/2013
WO    WO 2014/177925      11/2014

OTHER PUBLICATIONS

International Search Report for PCT/EP2016/075182 dated Feb. 23, 2017, 4 pages.
Written Opinion of the ISA for PCT/EP2016/075182 dated Feb. 23, 2017, 5 pages.

* cited by examiner

ESPRESSO COFFEE MACHINE AND METHOD FOR DISPENSING AN ESPRESSO COFFEE

This application is the U.S. national phase of International Application No. PCT/EP2016/075182 filed Oct. 20, 2016 which designated the U.S. and claims priority to IT Patent Application No. 102015000064535 filed Oct. 22, 2015, the entire contents of each of which are hereby incorporated by reference.

The present invention relates in general to the sector of machines for the preparation of beverages. More particularly it relates to an improved machine for espresso coffee (or other beverage). The present invention also relates to a method for dispensing an espresso coffee.

EP 2,490,580 relates to a machine for the preparation of coffee or the like. The machine comprises one or more operating groups, each of which comprises at least a boiler, a pump, a heating unit, and an aroma extraction unit and brewed espresso coffee dispensing unit with associated ducts. Each group is provided with a system for controlling and regulating parameters for production of the espresso coffee. According to one embodiment, the machine comprises means for modulating the pressure for extraction of the brewed espresso coffee. According to one embodiment, the machine comprises means for regulating the temperature for extraction of the brewed espresso coffee. According to one embodiment, the machine comprises a control unit in which different pressure profiles which can be retrieved by the operator are stored.

EP 2 314 182 A1 discloses a coffee machine with dispensing pressure regulation and a method relating thereto. EP 2 314 182 A1 comprises a control unit which may be operationally associated with a display and an input device such as a keyboard which may be operated by an operator in order to control and/or modify the flow of water supplied to the hydraulic circuit and therefore the dispensing pressure. For example, depending on the type of coffee used and/or the settings of the coffee grinder which supplies coffee powder for the coffee machine, it is possible to define a curve of pressure during dispensing. According to EP 2 314 182 A1 a water flow rate measurement device 28 is disposed along the hydraulic circuit, the device being apt to generate a control signal representative of the flow rate of water supplied by the pump and being electronically connected to the control unit to detect the flow rate of water and to regulate the flow rate of water supplied by the pump as a function of at least one detected water flow rate value.

The Applicant has realized that it is not possible to have an espresso coffee machine wherein a certain pressure curve is set and followed during dispensing of a coffee and, at the same time, a certain flow rate value is maintained. In fact, while a pressure curve can be set, the water flow generally varies because of several reasons such as size of coffee grind, compactness of coffee puck and mechanical obstructions along the water line. Similarly, if a certain flow rate is set, in real conditions the desired pressure curve is not followed.

The Applicant, while it has recognized that only one single parameter among pressure and flow rate can be controlled during coffee dispensing, it has felt the need to receive information in real time about flow rate during dispensing of coffee. Such information is deemed to be useful to an experienced barista during preparation of an espresso coffee shot. The barista, based on the real time information about flow rate, can, for example, decide to stop dispensing before standard time (this could be the case when coffee powder is slightly pressed in the filter). On the other hand, the barista can also decide to dispense for a long time when he realize that the flow rate is lower than desired value. The barista can modify the grinder settings, the tamping force or other parameters.

The object defined by the Applicant is that of providing a machine for espresso coffee (or other beverage) which provides the barista with an instrument for varying and adapting the behaviour of the machine when there is a variation in the surrounding conditions so as to obtain a high repeatability and qualitative uniformity during dispensing of the espresso coffee.

According to a first aspect, the present invention relates to a machine for preparing and dispensing an espresso coffee comprising:
  a water supply for feeding cold water;
  a dispensing group and a corresponding coffee boiler;
  a coffee pump which receives heated water and pumps said heated water towards said coffee boiler;
  a flow meter arranged between said coffee pump and said coffee boiler for measuring an instantaneous water flow rate, i.e., the volume of water that passes from said coffee pump to said coffee boiler per unit of time;
  a memory for storing at least one pressure profile, wherein said coffee pump is configured to operate according to said pressure profile during coffee dispensing; and
  a control unit which stops dispensing of coffee based on a measurement of water flow calculated from starting time of the dispensing.

The pressure profile can be represented as a line in a pressure-time diagram. Indeed it is a line of pressure values in the time frame from the initial time when dispensing is started to the end time when dispensing is stopped.

With "heated water" in the present description and claims is meant water which has been heated with respect to the water (typically at about room temperature) from water mains. For instance, if the non heated water is at about 20° C., the heated water is at a temperature higher than 40° C.

The instantaneous flow rate can be notified to the user on a display or in any other means. As an alternative, or in addition to the instantaneous flow rate, the total amount of liquid flown from said initial time can be notified to the user on a display or in any other means.

According to embodiments, the control unit is configured either
  to stop dispensing of espresso coffee before the end of said pressure profile if a preset amount of coffee is dispensed prior to a set dispensing time corresponding to the end of said pressure profile, therefore the stored pressure profile is cut off, or
  to stop dispensing of espresso coffee after the end of said pressure profile if a preset amount of coffee is not dispensed at a set dispensing time corresponding to the end of said pressure profile, therefore the stored pressure profile is extended to perform dispensing until said preset amount of coffee is reached.

According to embodiments, the stored pressure profile is extended by keeping the pressure value the same as that of the last value detected at the end of the pressure profile.

The control unit may comprises a comparison and verification device for comparing the measured water flow rate value and checking that this measured water flow rate value complies with a set criterion. According to embodiments, a notification device is provided for notifying a user of the outcome of this check. For instance, the set criterion is such that said measured flow rate value must be lower than a maximum water flow rate value and above a minimum water flow rate value. Other criteria can be devised.

As said above, according to certain embodiments, the notification device comprises a display for displaying the measured water flow rate value.

The notification device may be configured to signal to the user, visually and/or audibly, the outcome of the aforementioned check.

According to certain embodiments, the machine is also configured to repeat the volume of coffee which is dispensed during a dispensing step prior to the current one and stored.

According to a preferred embodiment, the machine comprises a preheater into the steam boiler, which receives cold water from said water supply and supplies hot water to said coffee boiler, wherein the coffee pump is arranged between the preheater and the coffee boiler.

According to embodiments of the invention, the machine also comprises a transceiver for receiving and/or transmitting data from and/or to a remote device through a wireless link, wherein said data includes at least one pressure profile executable by said machine during preparation and dispensing of an espresso coffee.

According to a second aspect, the present invention provides a method for preparing and dispensing an espresso coffee by a coffee machine, the method comprising the steps of:

feeding cold water;
pumping heated water towards a coffee boiler through a coffee pump which receives heated water; and
measuring an instantaneous water flow rate, i.e. the volume of water that passes from said coffee pump to said coffee boiler per unit of time;
wherein said coffee pump is configured to operate based on a pressure profile, and
wherein dispensing of coffee is stopped based on a measurement of water flow calculated from starting of the dispensing.

The instantaneous flow rate can be notified to the user on a display or in any other means. As an alternative, or in addition to the instantaneous flow rate, the total amount of liquid flown from said initial time can be notified to the user on a display or in any other means.

The dispensing of espresso coffee can be stopped either
before the end of said pressure profile if a preset amount of coffee is dispensed prior to a set dispensing time corresponding to the end of said pressure profile, therefore the stored pressure profile is cut off, or
after the end of said pressure profile if a preset amount of coffee is not dispensed at a set dispensing time corresponding to the end of said pressure profile, therefore the stored pressure profile is extended to perform dispensing until said preset amount of coffee is reached.

According to embodiments, the pressure profile is extended by keeping the pressure value the same as that of the last value detected at the end of the pressure profile.

The method could further comprise comparing the measured water flow rate value and checking that said measured water flow rate value complies with a set criterion.

Preferably, a user is notified of the outcome of this check.

According to embodiments, the set criterion is such that said measured flow rate value must be lower than a maximum water flow rate value and above a minimum water flow rate value.

The method may comprise the step of signaling to the user, visually and/or audibly, the outcome of the aforementioned check.

According to embodiments, the method further comprises the step of repeating also the volume of coffee which is dispensed during a dispensing step prior to the current one, the volume of coffee which is dispensed during the dispensing step prior to the current one being stored.

The present invention will become clearer from the following description, provided by way of a non-limiting example, to be read with reference to the accompanying drawings, in which:

FIG. 1 shows, in schematic form, a hydraulic circuit of a machine for preparing and dispensing a beverage according to an embodiment of the present invention. The following symbols have been used for illustration purposes: long dash-short dash lines=cold water; continuous lines=heated water; regular dash lines=electrical connections; and long dash-short dash-short dash lines=discharging system.

The description below, for the sake of convenience, refers in particular to an espresso coffee machine, but the present invention is not limited to such machines and is applicable to machines for dispensing other beverages. For example, barley or another cereal powder may be used instead of coffee powder. Therefore, the expression "espresso coffee machine" must be understood as comprising also machines for preparing other beverages. Similarly, the expression "espresso coffee" must be understood as having a wider meaning corresponding to the product (coffee, barley or other cereal) used for preparation of the beverage.

Figure 1:
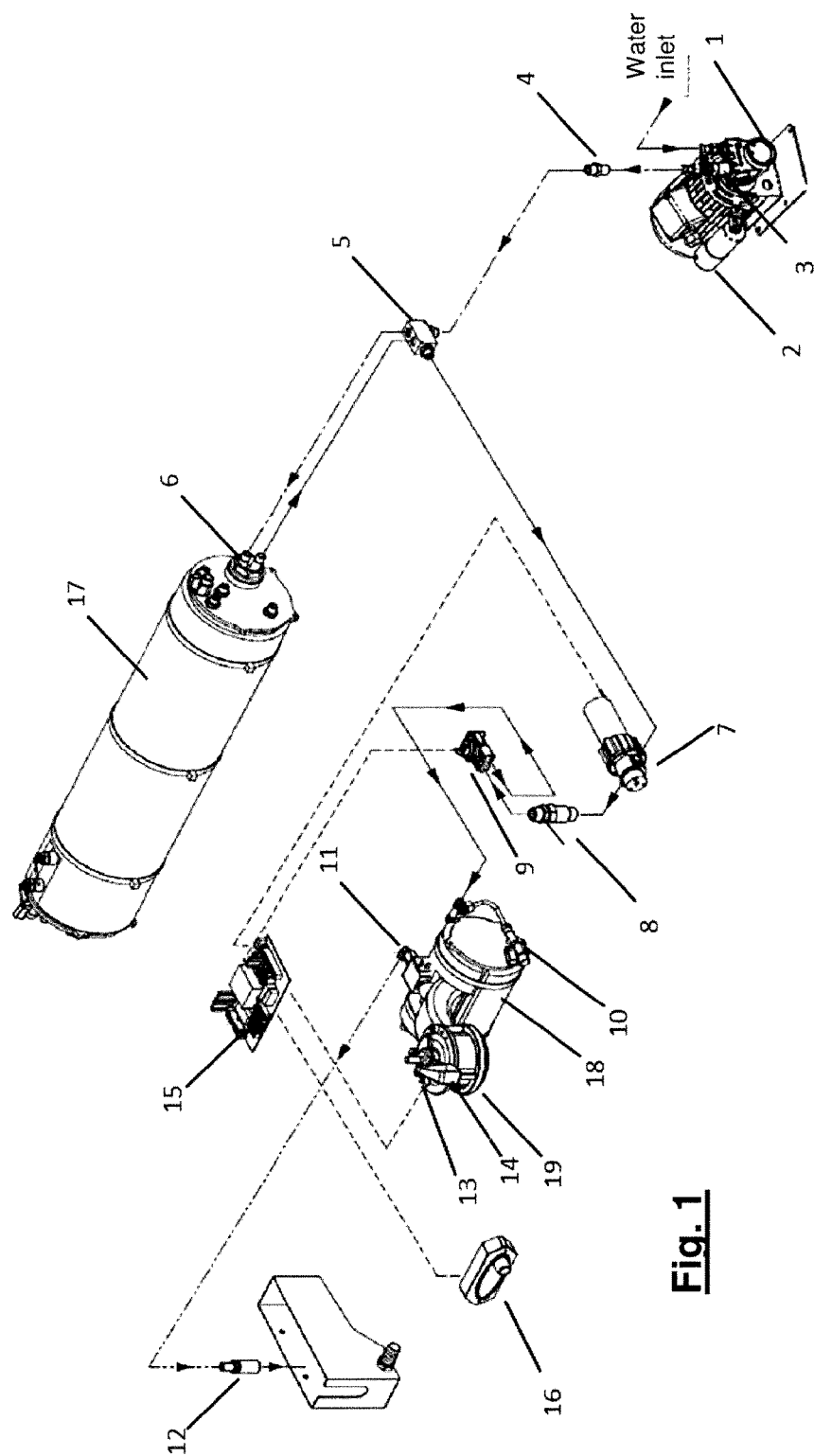
FIG. 1 shows, in schematic form, the hydraulic circuit of a machine for preparing and dispensing a beverage according to an embodiment of the present invention.

For greater clarity, a list of the components shown in FIG. 1 is shown below. Each component is identified by a reference number. Obviously the machine also comprises other components which are not shown since they are not of fundamental importance for understanding the invention. Typically, there may be one, two or three (or more) dispensing groups with respective components and respective coffee boiler.

1. Pump
2. Electric motor
3. Check valve
4. Nipple
5. Preheating mix valve
6. Preheating steam boiler
7. (Variable speed) coffee pump
8. Check valve
9. Flow meter
10. Coffee boiler inlet
11. Coffee group three-way solenoid valve
12. Expansion valve
13. Potentiometer
14. Lever
15. Control unit, typically comprising a CPU and a memory
16. Display
17. Steam boiler 18. Coffee boiler
19. Dispensing group Typically, there may be one, two or three (or more) dispensing groups with respective components and respective coffee boiler. The machine preferably also comprises a substantially closed box-like body and a support surface, with associated drip tray, for resting cups or other containers during dispensing of the beverage.

With reference to the diagram shown in FIG. 1, the machine comprises a pump 1 which receives water. Typically, the pump 1 receives water which is not heated. Typically the pump 1 receives cold water from a pipe and conveys said cold water under pressure to the components downstream. In other embodiments, the pump 1 is not present since a pressure (typically from the water mains) sufficient for correct operation of the machine is in any case ensured. This pressure for example may be about 3 bar.

A preheater in the steam boiler is preferably provided downstream of the pump 1. The preheater receives the cold water and heats it to a first temperature. According to one embodiment, the preheater is inserted in a steam boiler 17 configured to create steam and/or hot water (for example for preparing a cappuccino or the like, tea and infusions). This arrangement is particularly advantageous for making use of the energy since the preheater uses (at least partly) the heat of the steam boiler 17.

A mixer device 5 is preferably provided downstream of the preheater. In the mixer device 5, the hot water output from the preheater is mixed with the cold water supplied from the pump 1. In this way the temperature at the inlet of the coffee boiler 18 of the coffee group 19 is stabilized, preventing the water from entering at a temperature which is too high or too low. Therefore, according to an advantageous aspect of the present invention, the preheater makes passive use of the heat of the steam boiler 3 to preheat the water entering the coffee group 19, suitably mixed in the mixer device 4.

While the expression "group" or "coffee group" or "dispensing group" is well known to a man skilled in the art, it is remarked that a group is that part of an espresso coffee machine where pressurized water is delivered. Typically, a portafilter (or filter holder) holding a filter, is connected to the group when a shot of espresso coffee is delivered. In turn, the filter in the portafilter contains a puck of coffee grind. The pressurized hot water is caused to pass through the puck of coffee and to exit at proper exit points at the portafilter bottom wall.

At the outlet from the preheater 6, the water exits at a first temperature which is higher than 50° C. (preferably higher than 55° C. and lower than about 100° C., still preferably between about 55° C. and 65° C.) and variable, while at the outlet of the pump 1 the water exits at a temperature of about 10-20° C. or in any case at room temperature. The temperature of the water which passes through the pump 1 is typically influenced by the room temperature and in any case by the external temperature.

A coffee pump 7 is provided downstream of the mixer device 5 for pumping hot water towards the coffee boiler 18. Preferably, the circuit also includes a check valve and a flow meter 9 for measuring the water flow rate which, during dispensing of the beverage, flows per unit of time.

FIG. 1 also shows a control/operating lever 14 cooperating with a potentiometer 13. Typically, lever and potentiometer are arranged in the top part of each group 19. The lever 14, as will become clear from the description below, is operated (rotated in a first direction) by the user in order to start a dispensing cycle and is operated (rotated in the opposite direction) in order to interrupt dispensing.

FIG. 1 also shows, in schematic form, a control unit, typically comprising a processor (CPU or the like) for managing certain electrical and/or electronic functions of the machine. Preferably, the processor is mounted on an electronic board.

Figure 3:
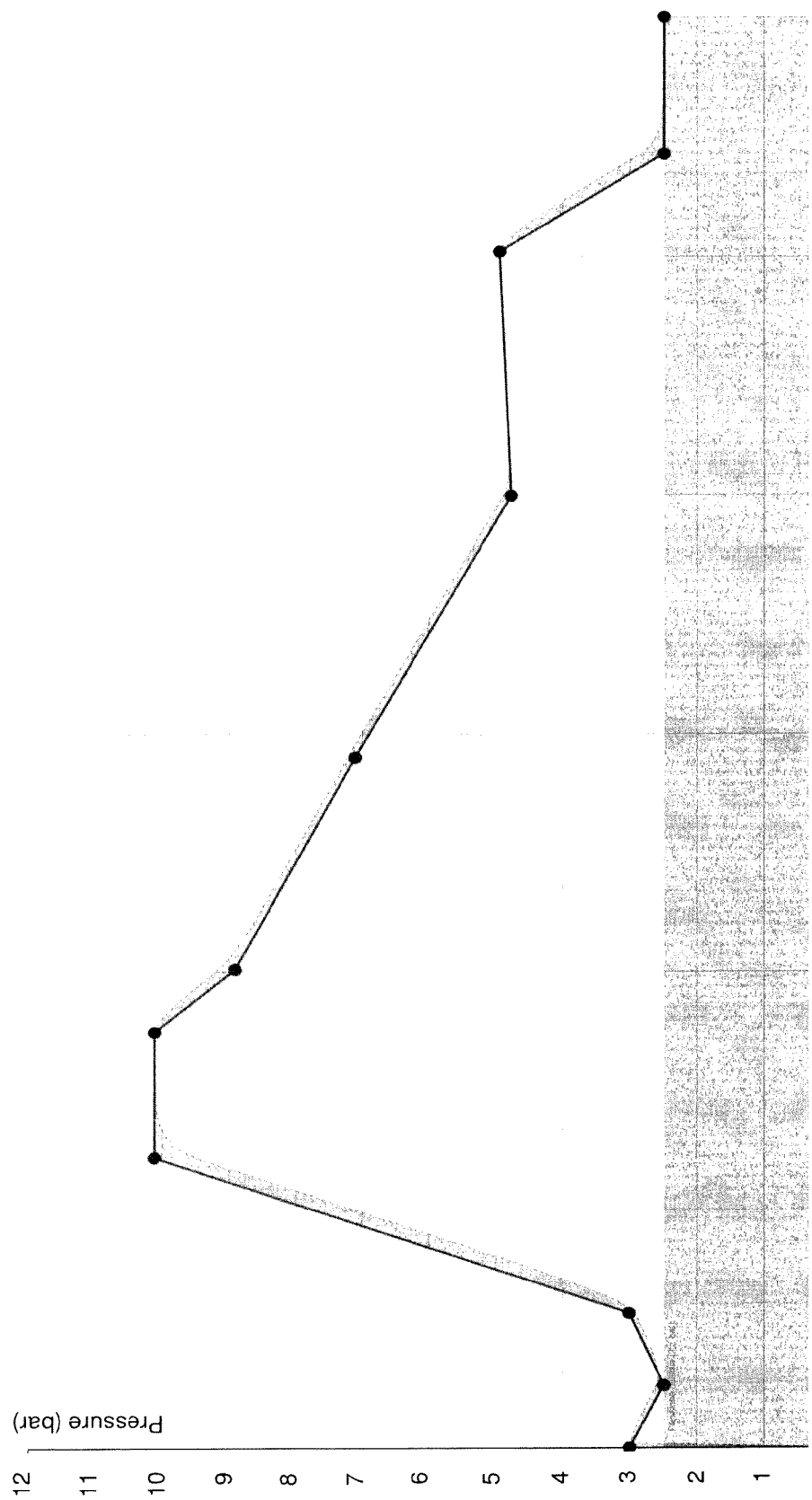
FIG. 3 shows an example of a pressure profile.

Preferably, the processor comprises a memory for storing one or more pressure profiles. Merely by way of example, FIG. 3 shows a pressure profile which can be used during dispensing of an espresso coffee or other similar beverage. The dispensing times are shown along the x axis, while the pressure values are shown along the y axis. The pressure profile for dispensing could also be substantially constant, increasing, decreasing or any combination thereof.

Preferably, the processor is connected to the potentiometer and the associated lever.

Preferably, the processor is also connected to the coffee pump 7.

Preferably, the processor is also connected to the flow meter 9.

Preferably, the processor is also connected to a display 16 for displaying one or more of the following data: (i) temperature of the dispensing water (preferably in ° C.), (ii) volume of dispensing water per unit of time (preferably in cubic centimetres per second); (iii) time lapsed from the start of dispensing; (iv) dispensing pressure (preferably in bar); and (v) pressure profile used for the current dispensing operation (preferably identified by one or more alphanumeric symbols).

Figure 2:
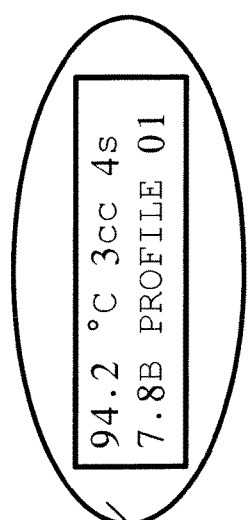
FIG. 2 is a schematic exemplary view of the information which may be displayed on a display of the machine according to an embodiment of the invention.

FIG. 2 shows an example of a display 16 with all the data (i)-(v) displayed. In particular, in the example the following are shown: dispensing temperature (94.2° C.), instantaneous flow (3 cc=3 cubic centimetres or millilitres of water per second), dispensing time (4 s), instantaneous dispensing pressure (7.8 bar), and the number of the pressure profile which the machine is currently executing (PROFILE 01). Preferably, the dispensing temperature is about 100° C., more preferably less than about 100° C. and still more preferably of about 94-94° C.

The value measured by the flow meter may be shown on the display (optionally with other information). Alternatively or in addition a visual and/or sound signal indicating the flow rate value may be provided. This may consist, for example, of an indicator lamp, a plurality of indicator lamps or a bar with segments which light up incrementally.

Following the activation of a flow meter 9, preferably one flow meter for each group 19, the machine according to the description may operate in at least a first mode and a second mode. The first mode is also referred to as pressure control mode. The second mode is also referred to as pressure and flow control mode.

First Operating Mode

The machine follows the pressure profile stored and set for the given time (for example 9 bar constant for 30 seconds), showing on the display 16 the instantaneous flow rate supplied by each group.

Advantageously, owing to the aforementioned flow meter, the flow rate value is shown on the display or else the flow rate value is indicated in another way. As a result of this flow display feature it is possible to have available additional data which is useful for achieving the correct outcome for the espresso coffee dispensing operation; in fact it is known that, in order to obtain a good espresso, the ground coffee puck must be prepared inside the filter such that a flow rate of between 0.5 cc/s and 3 cc/s is possible. In other words, the coffee grains must be ground and the powder coffee packed in such a way that the flow rate, during dispensing, falls within and remains within this range.

However, since there are many different ways of preparing an espresso, the flow range may be modified. Advantageously, in the case where the dispensed flow is outside of the set range, the flow value shown on the display (or indicated in another way to the user) flashes, thus alerting the barista that there is something wrong with dispensing.

Second Operating Mode

In this mode, the machine, in addition to executing the pressure profile stored and indicating instantaneously the instantaneous flow rate, also repeats the volume of coffee dispensed and stored.

More specifically, if the stored profile follows a pressure profile of 9 bar constant for 30 seconds, dispensing inside the cup 30 cc of coffee, under certain surrounding conditions (grinding and pressing for example), the subsequent dispensing operation will recreate exactly the same parameters for pressure, dispensing time and volume inside the cup. However, both the grinding step and the pressing step may be subject to variables such as the imperfect repetition of the degree of grinding during the course of the day, the imperfect repetition of the amount of coffee powder (traditionally the error resulting from the currently available mills ranges from 0.2 g to 1 g of coffee per 7 g dose), or the imperfect pressing of the coffee powder inside the filter, thus altering the conditions which resulted in 30 g of beverage in a cup in time interval of 30 seconds.

In the first operating mode, since the flow rate is not controlled but only displayed, if at least one of the aforementioned parameters varies, the amount of beverage in the cup will also necessarily vary.

On the other hand, in this second mode, owing to control of the flow rate, if for example the amount is reached prior to the set time, dispensing will stop beforehand upon reaching the desired amount inside the cup, "cutting off" earlier the pressure profile stored.

In the opposite case, i.e. if the dispensing operation does not reach the desired volume, for example within the set 30 seconds, the pressure profile will continue to perform dispensing until the amount of beverage inside the cup is reached, keeping the pressure value the same as that of the last value detected at 30 seconds.

Preferably, the displayed value of the instantaneous flow which flashes if the flow of the beverage exceeds the optimum time interval set does not change. In this way the amount inside the cup will therefore be always constant even when there is a variation in the surrounding conditions.

According to a preferred aspect of the present invention, the machine may operate in accordance with a certain pressure profile which may be stored in a memory. Loading of the pressure profiles may be performed in various ways. Preferably, loading of a pressure profile in the memory of the machine may be performed by means of a wireless connection established with a device outside of the machine. The device may be a tablet, a PC, a notebook, a netbook, a smartphone or other similar device. The connection may be wireless or performed by means of any known data transmission standard for (Wireless Personal Area Networks). For example, the Bluetooth standard provides a standard, low-cost and secure method for exchanging information between different devices via a secure short-range radio frequency.

Figure 4:
FIG. 4 shows an example of how a pressure profile may be created and edited by means of the touch screen devices.

Advantageously, a pressure profile may be created by a client or user using a touch screen type device. FIG. 4 shows by way of example the steps of drawing and editing a profile, adding a point to a profile and adding a series of points. The Figure illustrates visually how to perform each operation.

Figure 5:
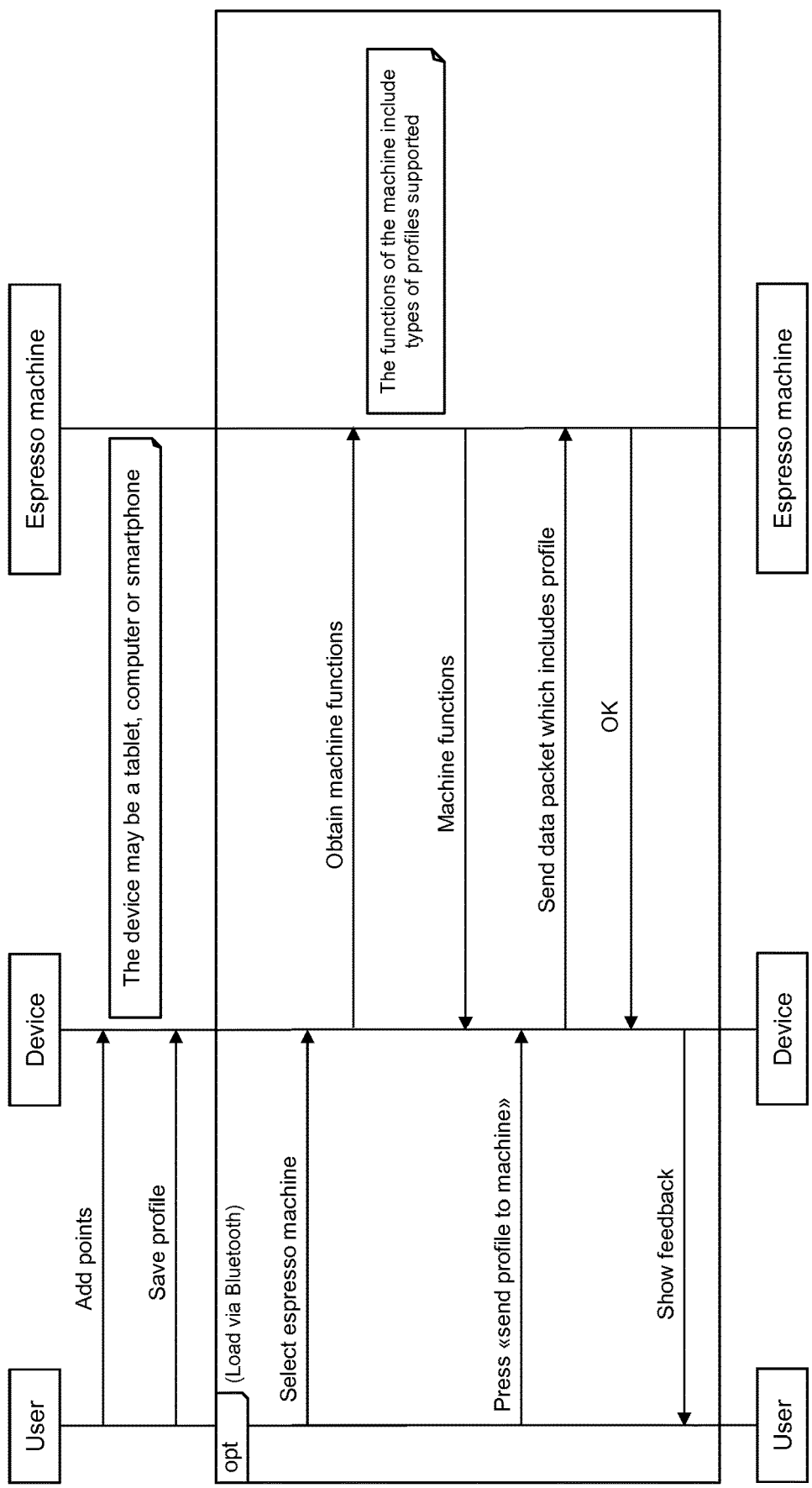
FIG. 5 shows the steps for loading the pressure profiles.

FIG. 5 is a graph which shows a time flow diagram of the data exchanged between users, device and espresso coffee machine. The graph may be understood by a person skilled in the art and it is not considered necessary to describe it in detail. In short, the user edits the pressure profile (adds points) and saves the profile. Then the user selects the machine to which the pressure profile is to be sent and the device sends to the machine a request for obtaining its functions. The functions of the machine may include for example the types of profiles supported. The machine, after receiving the request, sends its functions to the device. Then the user enters a command for sending the profile to the machine and the device sends a data packet which includes the profile to be loaded. Once loading of the profile has been performed, the machine confirms that loading has been performed and the positive outcome of the operation is preferably displayed on the device.

Figure 6:
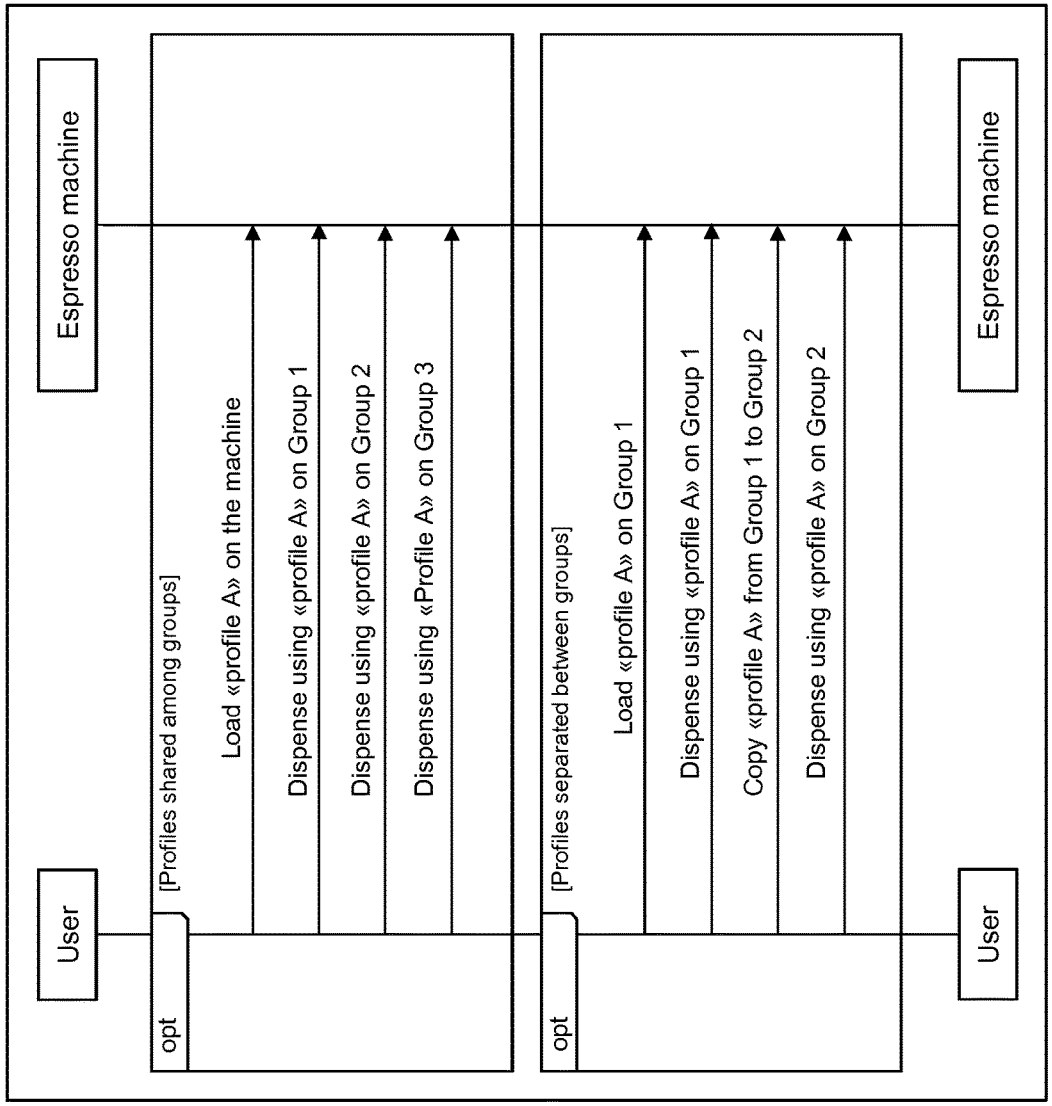
FIG. 6 shows in schematic form the use of pressure profiles.

As shown in FIG. 6, the profiles present in the machine may be used in two ways:

1) Shared throughout the machine and able to be accessed and used by any group;

2) Separate within each group.

In the first case, in each group each profile present in the machine may be selected and the coffee dispensed using this selected profile. In the second case the profile can be selected only if present in that group. Here the profiles may be copied between the groups by means of a copy option, the procedure being described in FIG. 6.

The profiles may be shown on the display of the machine or on the external device which, via Bluetooth or a similar protocol, receives the data from the machine.

The displayed information may relate to:

1) the stored profile which the machine must execute 2) the real-time profile which is effectively performed by the machine during dispensing of the coffee.

Figure 7:
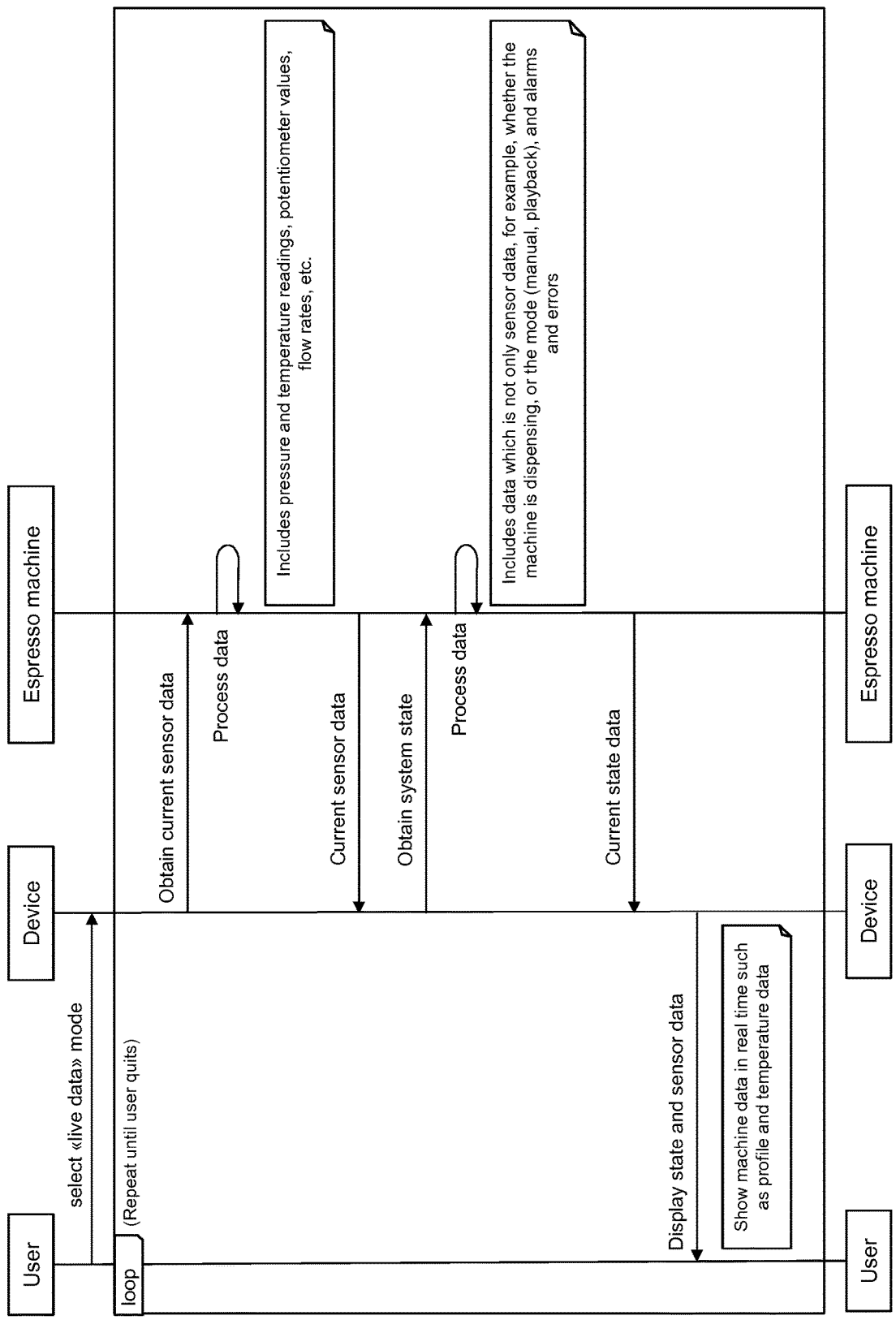
FIG. 7 shows in schematic form the displaying of data from the machine on a separate device.

To do this, the user selects a live mode on the device which requests the necessary data from the machine, as shown in FIG. 7.

This data may relate to the pressure and temperature readings, signal values, and flow rates, including data calculated and obtained from the machine data.

Moreover any alarms or errors occurring on the machine may also be displayed.

According to preferred embodiments, owing to the transceiver present in the machine allowing it to communicate with a remote device, it is possible to perform diagnostic operations. In other words, at least some of the diagnostics operations carried out on an espresso coffee machine may be performed from a remote location (laboratory or the like) without the need for the physical presence of technicians at the site where the machine is installed. Alternatively, advantageously, diagnostic operations, data collection, settings, etc., may be performed discretely and without interfering with the normal operation of the machine, using a remote device present at the location where the machine is present.

Via the wireless connection it is also possible to manage alarms and requests for technical assistance, provide statistics relating to the use and operation of the components electrically connected to the processor (CPU).

According to an advantageous aspect of the present invention, the pressure profiles to be used (i.e. "executed") on the machine may also be selected from a special web platform where a plurality of profiles are stored.

The invention claimed is:

1. A machine for preparing and dispensing an espresso coffee comprising:
a dispensing group and a corresponding boiler;
a pump which receives heated water and which is configured to pump said heated water towards said boiler;
a flow meter arranged between said pump and said boiler and configured to measure a water flow rate from said pump to said boiler;
a memory for storing at least one pressure profile, wherein said pump is configured to operate according to said pressure profile during coffee dispensing; and
a control unit connected to the flow meter and which is configured to stop dispensing of the espresso coffee from the dispensing group based on a measurement of water flow calculated from a starting time of the coffee dispensing.

2. The machine according to claim 1, wherein said control unit is configured either
to stop dispensing of the espresso coffee before an end of said pressure profile if a preset amount of the espresso coffee is dispensed prior to a set dispensing time corresponding to the end of said pressure profile, whereby the stored pressure profile is cut off, or
to stop dispensing of the espresso coffee after the end of said pressure profile if a preset amount of the espresso coffee is not dispensed at the set dispensing time corresponding to the end of said pressure profile, whereby the stored pressure profile is extended to perform dispensing until said preset amount of the espresso coffee is reached.

3. The machine according to claim 2, wherein the stored pressure profile is extended by keeping a pressure value the same as that of a last value detected at the end of the pressure profile.

4. The machine according to claim 1, wherein said control unit comprises:
a comparison and verification device for making a determination whether a measured water flow rate value complies with a set criterion;
a notification device configured to notify a user of an outcome of the determination; and
wherein said set criterion is such that said measured flow rate value must be lower than a maximum water flow rate value and above a minimum water flow rate value.

5. The machine according to claim 4, wherein said notification device comprises a display configured to display said measured water flow rate value.

6. The machine according to claim 5, wherein said notification device is configured to signal to the user, visually and/or audibly, the outcome of the determination.

7. The machine according to claim 1, wherein said machine is also configured to repeat a volume of the espresso coffee which is dispensed during a dispensing step prior to a current dispensing step, the volume of the espresso coffee which is dispensed during the dispensing step prior to the current dispensing step being stored.

8. The machine according to claim 1, wherein said machine comprises a preheater in the steam boiler, which receives cold water from said a water supply and supplies hot water to said boiler, wherein said pump is arranged between said preheater and said boiler.

9. The machine according to claim 1, also comprising a transceiver for receiving and/or transmitting data with a remote device through a wireless link, wherein said data includes at least one pressure profile executable by said machine during preparation and dispensing of the espresso coffee.

10. A method for preparing and dispensing an espresso coffee by a coffee machine, the method comprising:
pumping heated water towards a boiler through a pump which receives heated water;
measuring a water flow rate from said pump to said boiler per unit of time;
operating said pump according to a pressure profile, and
stopping dispensing of the espresso coffee based on a measurement of water flow calculated from starting of the dispensing.

11. The method according to claim 10, wherein said dispensing of the espresso coffee is stopped either
before an end of said pressure profile if a preset amount of the espresso coffee is dispensed prior to a set dispensing time corresponding to the end of said pressure profile, whereby the stored pressure profile is cut off, or
after the end of said pressure profile if the preset amount of the espresso coffee is not dispensed at the set dispensing time corresponding to the end of said pressure profile, whereby the stored pressure profile is extended to perform dispensing until said preset amount of the espresso coffee is reached.

12. The method according to claim 11, wherein the pressure profile is extended by keeping a pressure value the same as that of a last value detected at the end of the pressure profile.

13. The method according to claim 10, further comprising:
determining whether a measured water flow rate value complies with a set criterion; and
notifying a user of an outcome of the determination;
wherein said set criterion is such that said measured flow rate value must be lower than a maximum water flow rate value and above a minimum water flow rate value.

14. The method according to claim 1, further comprising signalling to the user, visually and/or audibly, the outcome of the determination.

15. The method according to claim 1, further comprising repeating also a volume of the espresso coffee which is dispensed during a dispensing step prior to a current dispensing step, the volume of the espresso coffee which is dispensed during the dispensing step prior to the current dispensing step being stored.

16. A machine for preparing and dispensing an espresso coffee comprising:
a dispensing group and a corresponding boiler;
a pump which receives heated water and configured to pump said heated water towards said boiler;
a flow meter arranged between said pump and said boiler and configured to measure a water flow rate from said pump to said boiler;
a memory for storing at least one pressure profile, wherein said pump is configured to operate according to said pressure profile during coffee dispensing; and
a control unit connected to the flow meter and configured to dispense the espresso coffee based on a measurement of water flow calculated from a starting time of the dispensing,
wherein said control unit is configured to stop the dispensing of the espresso coffee after an end of said pressure profile if a preset amount of the espresso coffee is not dispensed at a set dispensing time corresponding to the end of said pressure profile, whereby the stored pressure profile is extended to perform dispensing until said preset amount of the espresso coffee is reached, wherein the stored pressure profile is extended by keeping a pressure value the same as that of a last value detected at the end of the pressure profile.

17. The machine according to claim 16, wherein said control unit is further configured to stop dispensing of the espresso coffee before the end of said pressure profile if a preset amount of the espresso coffee is dispensed prior to a set dispensing time corresponding to the end of said pressure profile, whereby the stored pressure profile is cut off.

18. The machine according to claim 16, wherein said control unit comprises:

a comparison and verification device configured to make a determination whether a measured water flow rate value complies with a set criterion;

a notification device configured to notify a user of an outcome of the determination; and wherein said set criterion is such that said measured flow rate value must be lower than a maximum water flow rate value and above a minimum water flow rate value.

\* \* \* \* \*